E. W. COMFORT.
THERMOSTATIC REGULATING DEVICE.
APPLICATION FILED OCT. 10, 1910.
1,040,625.
Patented Oct. 8, 1912.
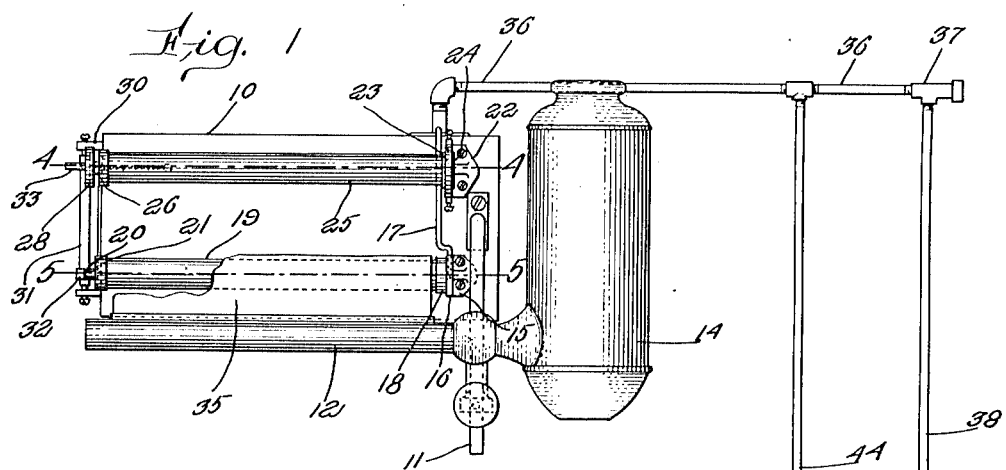
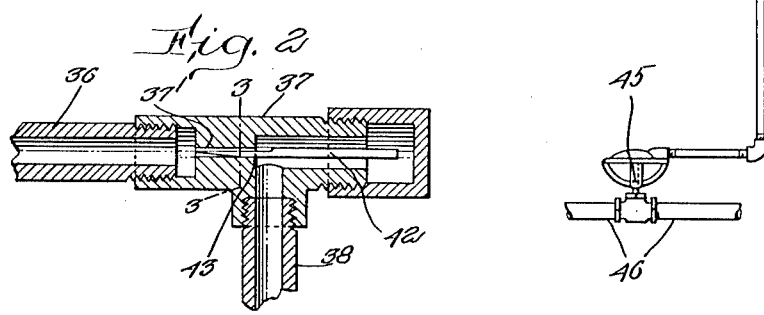
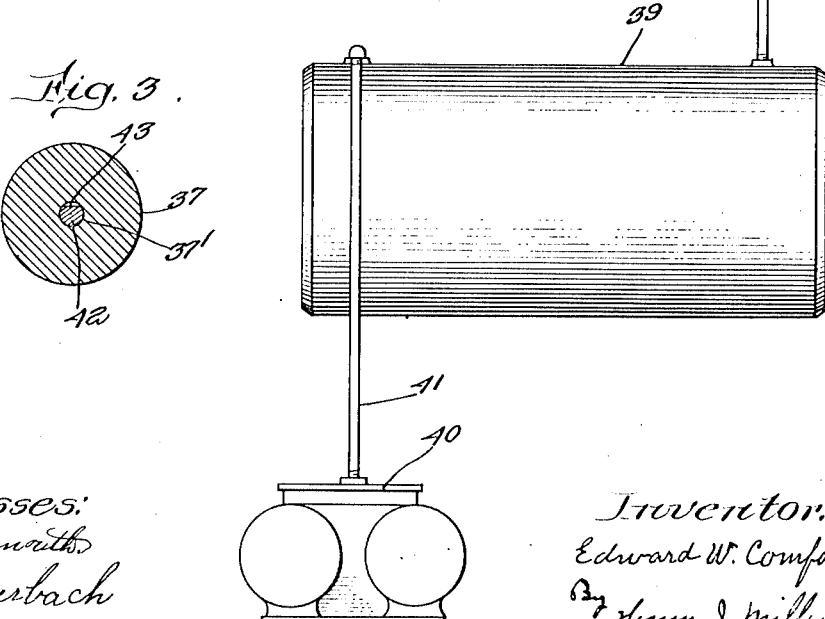
Witnesses:
L. B. Weymouth
E. E. Auerbach
Inventor:
Edward W. Comfort
By Henry J. Miller

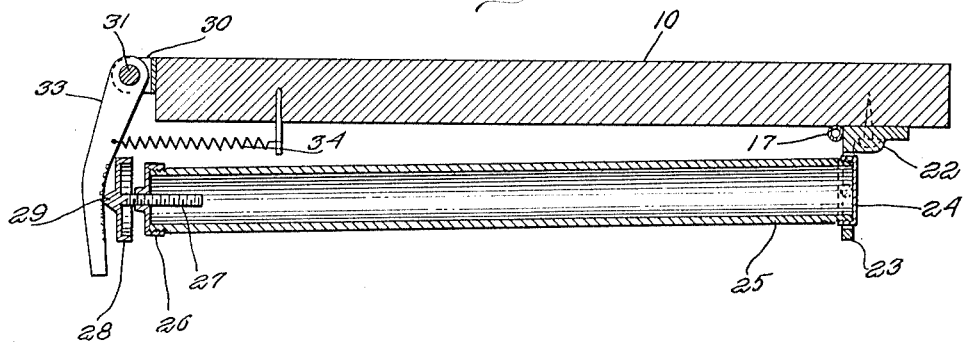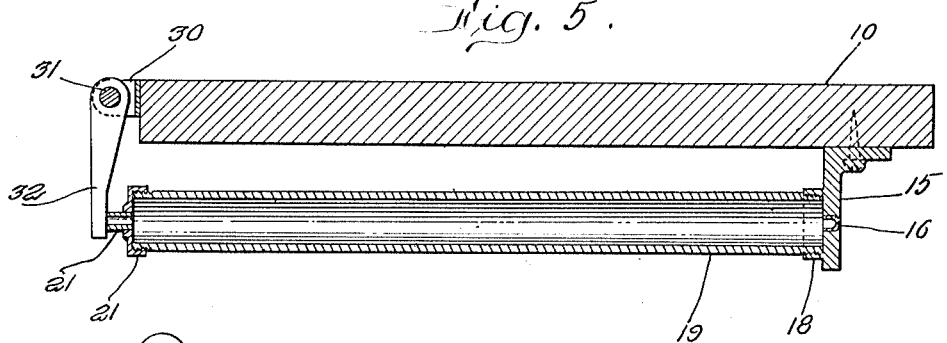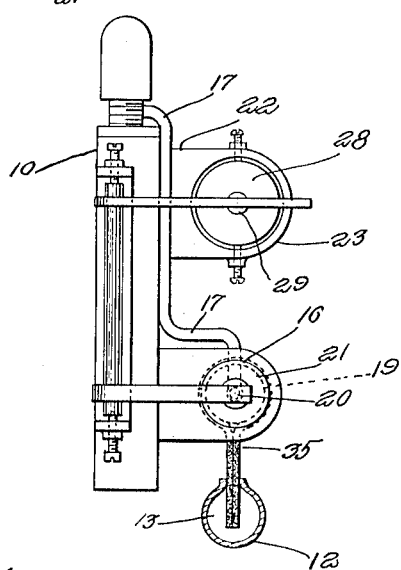

UNITED STATES PATENT OFFICE.

EDWARD W. COMFORT, OF CHICAGO, ILLINOIS.

THERMOSTATIC REGULATING DEVICE.

1,040,625. Specification of Letters Patent. Patented Oct. 8, 1912.

Application filed October 10, 1910. Serial No. 586,149.

*To all whom it may concern:*

Be it known that I, EDWARD W. COMFORT, of Chicago, in the county of Cook and State of Illinois, have invented a new and useful Improvement in Thermostatic Regulating Devices, of which the following is a specification, reference being had to the accompanying drawings, forming part thereof.

This invention has reference to improvements in thermostatic regulating devices or instruments adapted to be influenced by the temperature and humidity of the surrounding atmosphere to effect regulation of coöperating humidifying or moisture supplying mechanism.

One object of this invention is to so construct a thermostatic regulating device having two independent expansible elements adapted to be influenced respectively by the temperature and humidity of the surrounding atmosphere that a valve may be controlled by the action of one of said elements relative to the action of the other of said elements.

Another object of the invention is to so construct a thermostatic regulating device for a pressure controlled mechanism that one thermostatic element forms a passage for the pressure medium while another thermostatic element operates a valve for controlling the flow of the pressure medium from said first mentioned element.

Other objects of the invention will appear from the following description.

The invention consists in a thermostatic regulating device having a thermostatically movable outlet for a pressure system, and a thermostatically actuated valve for said outlet movable independently of said outlet.

The invention also consists in a regulating device for a pressure system having an outlet comprising a thermostatic wet bulb element, a valve for controlling the flow of pressure medium from said outlet, and a thermostatic dry bulb element for actuating said valve.

The invention also consists in such other novel features of construction and combination of parts as shall hereinafter be more fully described and pointed out in the claims.

Figure 1, represents a side elevation of the improved thermostatic regulating device connected with a pressure system by or through which the moisture supply is controlled. Fig. 2, represents an enlarged sectional view of the restricted passage in said pressure system. Fig. 3, represents an enlarged sectional view taken on line 3—3 Fig. 2. Fig. 4, represents an enlarged sectional view taken on line 4—4 Fig. 1. Fig. 5, represents a similar view of parts of the device taken on line 5—5 Fig. 1, the moisture conveying wick being omitted. Fig. 6, represents an enlarged end view of parts of the regulating device looking from a point at the left of Fig. 1, the water receptacle being in section.

Similar numbers of reference designate corresponding parts throughout.

As shown herein, in its preferred form, 10 represents any suitable base adapted to be mounted at any point at which the humidity of the air is to be regulated. Mounted on said base 10, is the depending arm 11 carrying the water receptacle 12 having a longitudinal slot 13 at its upper portion and connected at one end with the water reservoir 14, of any suitable construction, which supplies water to said receptacle 12. Mounted at one end of the base 10, is the bracket 15 having the channel 16, Fig. 5, with which the tube 17 connects, and communicating with one surface of said bracket 15 at a point embraced by the collar 18. Secured in this collar 18 is the wet bulb thermostatic element 19 tubular in shape and formed of hard rubber, gutta-percha, or other suitable material adapted to readily expand and contract under variations of temperature in the surrounding atmsophere. This element 19 is furnished with the restricted outlet 20 which, in the present structure, is shown as forming part of the cap 21 which is mounted on the end of the element 19.

At the upper end portion of the base 10 is mounted the bracket 22 in the ring 23 of which is pivotally mounted the cap 24 which supports the corresponding end of the dry bulb thermostatic element 25 formed of material similar to that of the element 19 and having, at its other end, the cap 26 having an axially positioned screw threaded spindle 27 of the thumb nut 28 which has the spur 29.

Adjacent to the ends of the elements 19 and 25 having respectively the outlet 20 and the thumb nut or set screw 28, is the bracket 30 which is secured to the base 10 and is furnished with bearings to rotatably support the shaft 31 having the valve arm 32, coöperating with the outlet 21, and the curved arm 33 having depressions at one side adapted to receive the spur 29 of the set screw 28 toward which spur said arm 33 is drawn by the action of the spring 34 secured to said arm 33 and to a fixed part of the mechanism.

Partially embracing the thermostatic element 19 is the wick 35 of absorbent material which extends into the water receptacle 12 and supplies moisture to subject said element 19 to the wet bulb temperature of the atmosphere surrounding such element 19. Communicating with the tube 17 is the pipe 36, connecting with any suitable pressure system which, preferably, includes the valve chamber 37 and with the pressure tank 39 in which latter a constant pressure is maintained by the compressor 40, of any suitable construction, connected with said tank by the pipe 41. The passage of the pressure medium through the bore 37' of the valve chamber is preferably restricted by the pin 42 extending into said bore and having the flat side 43, Figs. 2 and 3. Connected with the pipe 36 at a point intermediate the valve chamber 37 and the tube 17 is the pipe 44 through which pressure medium is supplied to the diaphragm valve 45, of any suitable construction, which controls the supply of humidity, supplied through the pipe 46, to any humidity delivering apparatus which is not shown herein as it forms no part of the present invention.

If, in the operation of this device, the outlet 20 or orifice of the wet bulb thermostatic element 19, is closed by the valve 32 the pressure in the pipe 44 will be sufficient to move or hold the diaphragm of valve 45 in one direction, while, if said outlet is opened, by the movement of the valve 32 away from said outlet or orifice 20 or by the contraction of the wet bulb element 19, the pressure medium will be free to escape from said outlet faster than said pressure medium can pass through the restricted bore 37' of the valve chamber 37 and the pressure in the pipe 44 will therefore be reduced thus permitting the diaphragm or other pressure controlled mechanism of valve 45 to actuate this valve in a direction opposite to that first mentioned and hence, controlling the supply of humidity through the pipe 46.

In operation the dry bulb thermostatic element 25 is affected directly by the temperature of the surrounding atmosphere while the wet bulb element 19 is affected by the lower temperature of evaporation owing to the presence of the moisture supplied in the vicinity of said element 19 by the wick 35. Such moisture evaporates in proportion to the relative lack of moisture in the atmosphere and, in ratio to such evaporation and as a result of the consequent reduction of temperature of the element 19, said element contracts and in case such contraction exceeds the normal amount withdraws the outlet or orifice 20 from the valve 32 thus permitting the escape of the pressure medium from said outlet or orifice. If, under abnormal conditions of humidity of the atmosphere, the relative temperature affecting the dry bulb element 25 becomes excessive, said element 25 will expand and, acting through the arm 33, will effect the swinging of valve 32 away from the outlet or orifice 20 thus opening said outlet to the escape of the pressure medium to reduce the pressure in the pipe 44 as a result of which the mechanism of the valve 45 is permitted to operate. Adjustment of the relative expansibility of the thermostatic elements 19 and 25, to effect the operation of the pressure controlling devices 20 and 32, may be had by swinging the free end of this element 25 toward or away from the pivot of arm 33. The spindle 27 is screwed in or out to accommodate its spur 29 to such adjustment so that said spur may engage one of the notches or depressions of arm 33.

In order to more conveniently and compactly illustrate the thermostatic regulating device, I have shown both thermostatic elements secured to one base in approximately close relation, but I do not wish to limit this invention thereby.

It is not my intention to limit myself to the mounting of the pressure escape outlet or orifice on the end of one of the thermostatic elements as I understand that said outlet or orifice may be thermostatically operated with relation to a closure in other ways than that shown and described.

Having thus described my invention, I claim as new and desire to secure by Letters Patent.

1. A regulating device of the nature described comprising a thermostatic element, a closure operated thereby in one direction by the expansion of said element, a pressure escape outlet member coöperating with said closure, and a second thermostatic element in operative relation to said outlet member to positively move said member in two directions respectively under expansion and contraction.

2. A regulating device of the nature described comprising a tubular wet bulb thermostatic element having an outlet member, a dry bulb thermostatic element, and a closure for said outlet member pivotally mounted and operated in one direction solely by said dry bulb element.

3. A regulating device of the nature described comprising a tubular thermostatic element supported at one end and having an outlet, a closure pivotally mounted and coöperating with said outlet, and a second thermostatic element in operative relation to said closure.

4. A regulating device of the nature described comprising a tubular thermostatic member fixed against movement and having an outlet member, a closure for said outlet pivotally mounted and furnished with a lever arm, and a second thermostatic member coöperating with said arm to move said closure.

5. A regulating device of the nature described comprising a tubular thermostatic element having an outlet, a closure for said outlet pivotally mounted, an arm for operating said closure, and a second thermostatic member having an adjustable screw in engagement with said arm.

6. A regulating device of the nature described comprising two thermostatic elements adapted to be separately influenced by the dry and wet bulb temperatures of the air, one of said elements being pivotally mounted, coöperating pressure controlling devices of which one is actuated by said pivoted element and has a lever with relation to which said pivoted member may be adjusted to vary the degree of movement of said closure under the expansion of said element, substantially as described.

EDWARD W. COMFORT.

Witnesses:
 N. J. MILLER,
 E. E. AUERBACH.